US012719083B2

(12) United States Patent
Li et al.

(10) Patent No.: US 12,719,083 B2
(45) Date of Patent: Aug. 25, 2026

(54) SECONDARY BATTERY, BATTERY MODULE, BATTERY PACK, AND POWER CONSUMPTION APPARATUS

(71) Applicant: CONTEMPORARY AMPEREX TECHNOLOGY (HONG KONG) LIMITED, Hong Kong (CN)

(72) Inventors: Liye Li, Ningde City (CN); Peipei Chen, Ningde City (CN); Limei Zhang, Ningde City (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 634 days.

(21) Appl. No.: 17/943,212

(22) Filed: Sep. 13, 2022

(65) Prior Publication Data

US 2023/0104940 A1 Apr. 6, 2023

Related U.S. Application Data

(63) Continuation of application No. PCT/CN2021/121108, filed on Sep. 27, 2021.

(51) Int. Cl.

| | |
|---|---|
| ***H01M 10/0567*** | (2010.01) |
| ***H01M 4/02*** | (2006.01) |
| ***H01M 4/485*** | (2010.01) |
| ***H01M 4/505*** | (2010.01) |
| ***H01M 4/525*** | (2010.01) |
| ***H01M 10/0525*** | (2010.01) |
| ***H01M 10/0568*** | (2010.01) |

(52) U.S. Cl.

CPC ....... *H01M 10/0567* (2013.01); *H01M 4/485* (2013.01); *H01M 4/505* (2013.01); *H01M 4/525* (2013.01); *H01M 10/0525* (2013.01); *H01M 10/0568* (2013.01); *H01M 2004/021* (2013.01); *H01M 2004/028* (2013.01); *H01M 2300/0025* (2013.01)

(58) Field of Classification Search

None

See application file for complete search history.

(56) References Cited

U.S. PATENT DOCUMENTS

| | | | | |
|---|---|---|---|---|
| 2015/0270575 | A1 | 9/2015 | Nishie et al. | |
| 2015/0280282 | A1 | 10/2015 | Nishie et al. | |
| 2016/0133991 | A1 | 5/2016 | Kawasoe et al. | |
| 2017/0237126 | A1 | 8/2017 | Son et al. | |
| 2019/0020065 | A1* | 1/2019 | Son | C07D 497/10 |
| 2019/0341598 | A1 | 11/2019 | Nam et al. | |
| 2020/0313237 | A1* | 10/2020 | Hu | H01M 10/0525 |
| 2022/0052338 | A1 | 2/2022 | Li et al. | |
| 2022/0115695 | A1 | 4/2022 | Tang et al. | |
| 2022/0158242 | A1 | 5/2022 | Wang et al. | |

FOREIGN PATENT DOCUMENTS

| | | | | |
|---|---|---|---|---|
| CN | 103098290 | A | 5/2013 | |
| CN | 104718658 | A | 6/2015 | |
| CN | 105409049 | A | 3/2016 | |
| CN | 109950621 | A | 6/2019 | |
| CN | 110021785 | A | 7/2019 | |
| CN | 110518232 | A | 11/2019 | |
| CN | 110577245 | A * | 12/2019 | H01M 10/0525 |
| CN | 111293357 | A | 6/2020 | |
| CN | 109273710 | B | 10/2020 | |
| CN | 112349958 | A | 2/2021 | |
| CN | 112400249 | A | 2/2021 | |
| EP | 2905836 | A1 | 8/2015 | |
| EP | 2913880 | A1 | 9/2015 | |
| EP | 3007263 | A1 | 4/2016 | |
| EP | 3205655 | A1 | 8/2017 | |
| EP | 3561920 | A1 | 10/2019 | |
| EP | 3951946 | A1 | 2/2022 | |
| JP | 2015-162289 | A | 9/2015 | |
| JP | 2015-176760 | A | 10/2015 | |
| JP | 6225914 | B2 | 11/2017 | |
| JP | 6260619 | B2 | 1/2018 | |
| JP | 6368501 | B2 | 8/2018 | |
| JP | 2020-514972 | A | 5/2020 | |
| JP | 2021-101432 | A | 7/2021 | |

(Continued)

OTHER PUBLICATIONS

Machine translation of CN 110577245A, published on Dec. 17, 2019 (Year: 2019).*

(Continued)

*Primary Examiner* — Anca Eoff

(74) *Attorney, Agent, or Firm* — XSENSUS LLP

(57) ABSTRACT

The present application provides a secondary battery. The secondary battery may include a positive electrode sheet, a negative electrode sheet, and an electrolytic solution, where the positive electrode sheet may include a positive active material; in the positive active material, a contained rate of an element Co may satisfy: Co≤0.09, and a content of an element Al may satisfy: 500 ppm≤Al≤10000 ppm; and the electrolytic solution may include a compound represented by the following general formula (I).

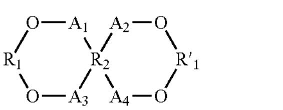

(I)

10 Claims, 2 Drawing Sheets

(56) References Cited

FOREIGN PATENT DOCUMENTS

| | | | | |
|---|---|---|---|---|
| KR | 20170039369 | A | * | 4/2017 |
| WO | 2014/054197 | A1 | | 4/2014 |
| WO | 2020/220662 | A1 | | 11/2020 |
| WO | 2021/042986 | A1 | | 3/2021 |
| WO | 2021/125478 | A1 | | 6/2021 |
| WO | 2021/189255 | A1 | | 9/2021 |

OTHER PUBLICATIONS

Machine translation of KR20170039369A, published on Apr. 11, 2017 (Year: 2017).*

Office Action issued Jan. 29, 2024 in Japanese Patent Application No. 2022-553657 with English translation thereof.

International Search Report and Written Opinion mailed on Apr. 8, 2022, received for PCT Application PCT/CN2021/121108, filed on Sep. 27, 2021, 17 pages including English Translation.

Extended European search report issued on Aug. 23, 2023, in corresponding European patent Application No. 21925088.3, 11 pages.

First Office Action mailed on May 19, 2026, received for CN Application 202180087213.0, 15 pages including English Translation.

* cited by examiner

SECONDARY BATTERY, BATTERY MODULE, BATTERY PACK, AND POWER CONSUMPTION APPARATUS

CROSS REFERENCE TO RELATED APPLICATION

The present application is a continuation of International Application No. PCT/CN2021/121108, filed Sep. 27, 2021, the entire content of which is incorporated herein by reference in its entirety.

TECHNICAL FIELD

The present application relates to the field of secondary battery technologies, and in particular, to a secondary battery, a battery module, a battery pack, and a power consumption apparatus.

BACKGROUND

In recent years, with the wider application of secondary batteries, the secondary batteries are widely applied to energy storage power systems, such as hydraulic power, thermal power, wind power and solar power plants, as well as many fields, such as electric tools, electric bicycles, electric motorcycles, electric vehicles, military equipment and aerospace. Due to the great development and demands of the secondary batteries, higher requirements are put forward for their energy density, cycle performance, safety performance and the like, and there are more expectations for the improvement of their cost performance.

In addition, in a secondary battery, especially in a lithium-ion secondary battery, a positive electrode is in a high SOC during charging and storage, and interface oxidation activity between the positive electrode and a solvent is high. An oxidation decomposition reaction occurs after the solvent contacts a positive interface, which leads to an unstable structure of a positive electrode material and reduction of a lithiation/delithiation capability and speed, and further leads to continuous self-discharge in an interior of a battery cell of the secondary battery and acceleration of reduction of the secondary battery life. In addition, gas generated at the interface due to the reaction between the solvent and the positive interface also leads to an increase of impedance of the positive interface.

In the prior art, an electrolytic solution and a positive interface are physically separated generally by performing doping or various coatings on a positive electrode material to obtain a stable positive structure. However, there are still the following problems in these technologies: since a coating layer is easily broken, interface reactions occur continuously once it is broken, self-discharge of a battery cell is serious, and the battery life is rapidly reduced; or due to a small amount of doping or coating substances added, the protection is insufficient, resulting in limited improvement of battery performance; or even if the amount of the doping or coating substances added is sufficient to form a stable interface protective film, interface impedance seriously deteriorates by the protective film. Therefore, the existing technology for processing positive electrode materials still needs to be improved.

SUMMARY

The present application is made in view of the foregoing technical problems, and the objective is to provide a secondary battery, which reduces the cost of the secondary battery, effectively reduces a self-discharge rate of a battery cell, and improves a storage impedance growth rate of the battery cell, and has good rate discharge capacity efficiency.

In order to achieve the foregoing objective, the inventor of the present application has conducted an intensive study, and found that the foregoing technical problems can be solved by adjusting a specific metallic element in a positive electrode material of the second battery and cooperatively using a specific additive in an electrolytic solution.

According to a first aspect of the present application, a secondary battery is provided, including: a positive electrode sheet, a negative electrode sheet, and an electrolytic solution,

- where the positive electrode sheet includes a positive active material;
- in the positive active material, a contained rate of an element Co satisfies: Co≤0.09, and a content of an element Al satisfies: 500 ppm≤Al≤10000 ppm;
- the electrolytic solution includes a compound represented by the following general formula (I); and

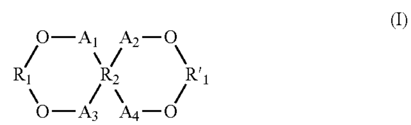

(I)

- in the general formula (I), $A_1$~$A_4$ each are independently a single bond or an alkylene group with 1-5 carbon atom(s), $R_1$ and $R_{1'}$ each are independently

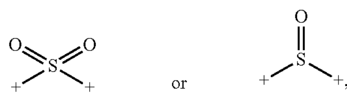

and $R_2$ is

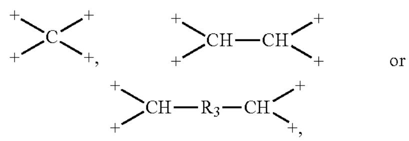

where $R_3$ is an alkylene group or alkyleneoxy group with 1~3 carbon atom(s).

Accordingly, in the present application for invention, by reducing a content of Co in a positive active material, the cost of a positive electrode material can be reduced; by including Al in the positive active material and appropriately adjusting a content of Al, a degree of mixed arrangement of Li/Ni can be reduced due to the reduction of the content of Co, and structural stability and an ion-conducting capability of the positive electrode material can be improved; and further, by including a compound represented by the foregoing general formula (I) in an electrolytic solution, a chelate can be formed by the compound represented by the foregoing general formula (I) and Al to effectively stabilize an element Al on a surface of the positive electrode material and separate the electrolytic solution from a positive interface, reducing interfacial side reactions, so that a secondary battery, which reduces the cost of the secondary battery, effectively reduces a self-discharge rate of a battery cell, and improves a storage impedance growth rate of the battery cell, and improves rate discharge capacity efficiency, can be obtained.

In any embodiment, a mass percent content of the compound of the general formula (I) in the electrolytic solution is 0.01%~15%, optionally 0.1%~10%, and further optionally 0.5%~5%

Accordingly, the reduction of the self-discharge rate of the secondary battery, the reduction of the storage impedance growth rate of the battery cell, and the improvement of the rate discharge capacity efficiency can be achieved in a balanced manner.

In any embodiment, optionally, in the general formula (I), $A_1$~$A_4$ each are independently a single bond or an alkylene group with 1-3 carbon atom(s), further optionally a single bond or methylene. Optionally, $R_2$ is

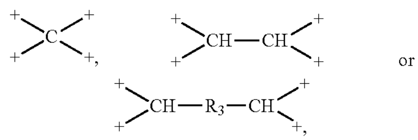

or where $R_3$ is an alkylene group or alkyleneoxy group with 1 or 2 carbon atoms.

Accordingly, a chelate can be formed by the compound represented by the foregoing general formula (I) and Al to effectively stabilize the surface of the positive electrode material and separate the electrolytic solution from the positive interface, thereby effectively reducing the self-discharge rate of the battery cell, improving the storage impedance growth rate of the battery cell, and improving the rate discharge capacity efficiency of the battery.

In addition, in any embodiment, the compound represented by the general formula (I) is selected from at least one of the following compounds 1-18, Compound 1

Compound 2

Compound 3

Compound 4

Compound 5

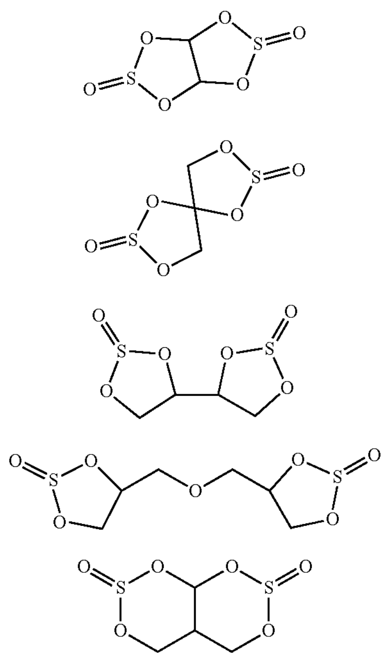

-continued

Compound 6

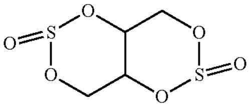

Compound 7

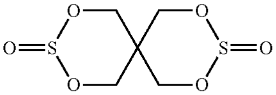

Compound 8

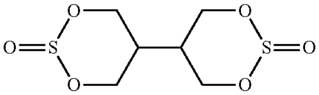

Compound 9

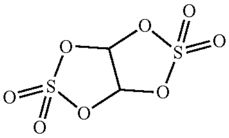

Compound 10

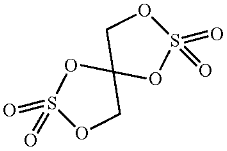

Compound 11

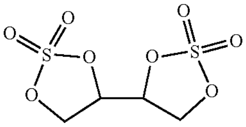

Compound 12

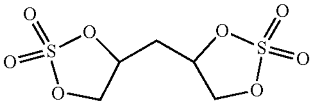

Compound 13

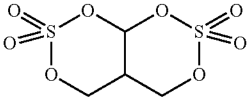

Compound 14

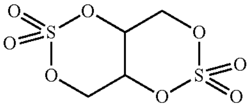

Compound 15

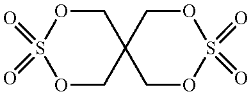

Compound 16

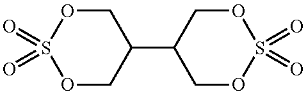

Compound 17

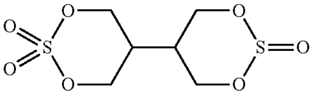

Compound 18

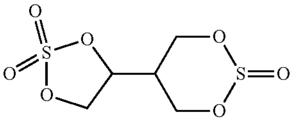

Accordingly, the surface of the positive electrode material can be further stabilized, the self-discharge rate of the battery cell can be reduced, the storage impedance growth rate of the battery cell can be improved, and the rate discharge capacity efficiency can be improved.

In any embodiment, optionally, the content of the element Al satisfies 1000 ppm≤Al≤10000 ppm, further optionally 1000 ppm≤Al≤7000 ppm.

Accordingly, the self-discharge rate of the battery cell can be further reduced, the storage impedance growth rate of the battery cell can be improved, and the rate discharge capacity efficiency can be improved.

In addition, in any embodiment, a general formula of the positive active material is: $LiNi_zMn_yCo_xAl_aO_2$, where $x \leq 0.09$, $0.0005 \leq a \leq 0.01$, $0.5 < z < 1$, $0 < y < 0.4$, and $x+y+z+a=1$. Accordingly, both reduction of the cost of the secondary battery and improvement of the structural stability and the ion-conducting capability of the positive electrode material can be achieved.

In any embodiment, optionally, the electrolytic solution further includes another additive selected from at least one of lithium tetrafluoroborate, lithium bisoxalateborate, lithium difluorooxalateborate, and tris(trimethylsilyl)borate. Optionally, a mass percent content of a total amount of the another additive in the electrolytic solution is 0.2%~3%. Accordingly, the self-discharge rate of the battery cell can be further reduced, the storage impedance growth rate of the battery cell can be improved, and the rate discharge capacity efficiency can be improved.

In any embodiment, optionally, a specific surface area of the positive active material is 0.5~3 $m^2/g$, optionally 0.5~2.5 $m^2/g$. Accordingly, the needs for rapid transport of lithium ions and control of side reactions on the positive surface can be met in a balanced manner, and the need for high-rate charging and discharging of the battery cell can be met.

According to a second aspect of the present application, a battery module is further provided, including the secondary battery according to the first aspect of the present application.

According to a third aspect of the present application, a battery pack is further provided, including the battery module according to the second aspect of the present application.

According to a fourth aspect of the present application, a power consumption apparatus is further provided, including the secondary battery according to the first aspect, the battery module according to the second aspect or the battery pack according to the third aspect of the present application.

The battery module, the battery pack, and the power consumption apparatus in the present application include the secondary battery according to the first aspect of the present application, and thus have at least the same or similar technical effects as the foregoing secondary battery.

DESCRIPTION OF REFERENCE SIGNS

Figure 1:
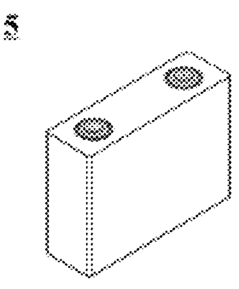
FIG. 1 is a schematic diagram of a secondary battery according to an embodiment of the present application.

1 battery pack; 2 upper box body; 3 lower box body; 4 battery module; 5 secondary battery; 51 housing; 52 electrode assembly; 53 top cover assembly.

DESCRIPTION OF EMBODIMENTS

Embodiments that specifically disclose a secondary battery, a battery module, a battery pack and an electrical apparatus of the present application will be described below in detail with reference to the accompanying drawings as appropriate. However, unnecessarily detailed descriptions may be omitted in some cases. For example, detailed description for a well-known matter and repeated description for a practically identical structures are omitted. This is done to avoid unnecessarily redundant descriptions for ease of understanding by persons skilled in the art. In addition, the drawings and the following description are provided for persons skilled in the art to fully appreciate the present application, and are not intended to limit the subject matters described in the claims.

A "range" disclosed herein is defined in the form of a lower limit and an upper limit. A given range is defined by selecting a lower limit and an upper limit, and the selected lower limit and upper limit define a boundary of a particular range. The range defined in this manner may or may not include end values, and may be combined arbitrarily, that is, any lower limit may be combined with any upper limit to form a range. For example, if ranges of 60-120 and 80-110 are listed for a particular parameter, it is understood that ranges of 60-110 and 80-120 are also contemplated. In addition, if the minimum range values listed are 1 and 2, and the maximum range values listed are 3, 4 and 5, all the following ranges are contemplated: 1-3, 1-4, 1-5, 2-3, 2-4, and 2-5. In the present application, unless otherwise specified, a numerical range "a-b" represents an abbreviated representation of any combination of real numbers between a and b, where both a and b are real numbers. For example, a numerical range "0-5" means that all real numbers between "0-5" have been listed herein, and "0-5" is just an abbreviated representation of a combination of these numerical values. In addition, when a certain parameter is expressed as an integer ≥2, it is equivalent to disclosing that the parameter is, for example, an integer of 2, 3, 4, 5, 6, 7, 8, 9, 10, 11, 12, or the like.

Unless otherwise specified, all embodiments and optional embodiments of the present application may be combined with each other to form a new technical solution.

Unless otherwise specified, all technical features and optional technical features of the present application may be combined with each other to form a new technical solution.

Unless otherwise specified, all steps of the present application may be performed sequentially or randomly, but preferably, performed sequentially. For example, a method includes steps (a) and (b), which means that the method may include steps (a) and (b) performed sequentially, or steps (b) and (a) performed sequentially. For example, the method mentioned may further include step (c), which means that step (c) may be added to the method in any order, for example, the method may include steps (a), (b) and (c), steps (a), (c) and (b), steps (c), (a) and (b), or the like.

Unless otherwise specified, "comprising" and "containing" mentioned in the present application are open-ended or closed-ended. For example, the "comprising" and "containing" may mean that other components that are not listed may further be comprised or contained, or only listed components may be comprised or contained.

In the present application, unless otherwise specified, the term "or" is inclusive. For example, the phrase "A or B" means "A, B or both A and B". More particularly, a condition "A or B" is satisfied by any one of the following: A is true (or present) and B is false (or not present); A is false (or not present) and B is true (or present); or both A and B are true (or present).

In an embodiment of the present application, the present application provides a secondary battery, and as an example, the present application provides a lithium-ion secondary battery.

[Secondary Battery]

A secondary battery of the present application includes: a positive electrode sheet, a negative electrode sheet, and an electrolytic solution, where the positive electrode sheet includes a positive active material; in the positive active material, a contained rate of an element Co satisfies: Co≤0.09, and a content of an element Al satisfies: 500 ppm≤Al≤10000 ppm; and in addition, the electrolytic solution includes a compound represented by the following general formula (I); and

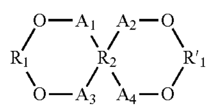

(I)

in the general formula (I), $A_1$~$A_4$ each are independently a single bond or an alkylene group with 1-5 carbon atom(s), $R_1$ and $R_{1'}$ each are independently

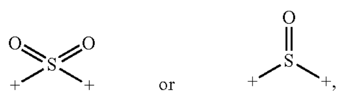

and $R_2$ is

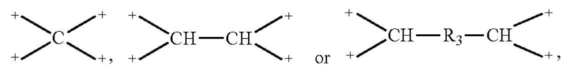

where $R_3$ is an alkylene group or alkyleneoxy group with 1-3 carbon atom(s).

The applicant surprisingly found that a secondary battery, which reduces the cost of the secondary battery, effectively reduces a self-discharge rate of a battery cell, improves a storage impedance growth rate of the battery cell, and has good rate discharge capacity efficiency, can be obtained by reducing a content of an element Co in a positive active material of the second battery, including an appropriate amount of an element Al, and further including a compound represented by the general formula (I) in an electrolytic solution.

Although the mechanism is not clear yet, the applicant considers as follows.

Since the cost of a positive electrode material is the highest in the composition of a secondary battery, for example, in a lithium-ion secondary battery, the price of an element cobalt in a ternary positive electrode is the highest and fluctuates greatly and the cobalt is scarce, the reduction of a content of the element cobalt can significantly reduce the cost of the secondary battery. However, on the other hand, the reduction of the content of the element cobalt may not only reduce an electron-conducting capacity of a ternary positive electrode material, but also increase a phenomenon of mixed arrangement of Li/Ni, restrict solid-state migration and diffusion of lithium ions, and reduce ion transport performance of the positive electrode material. Moreover, the mixed arrangement of Li/Ni may lead to an irreversible phase transformation of the positive electrode material, aggravate breakage of positive particles and expose many fresh surfaces, so that side reactions between a positive active material and an electrolytic solution occur continuously at an interface between the positive electrode material and the electrolytic solution, which leads to continuous self-discharge in an interior of a battery cell and a significant increase in impedance.

For this reason, by introducing an element Al in the synthesis of the positive active material and realizing uniform distribution of the element Al on a bulk phase and surface, not only is a degree of mixed arrangement of Li/Ni effectively reduced, structural stability and an ion-conducing capacity of the positive electrode material are improved, but also spherical morphology of the positive electrode material can be promoted to be uniform, which is beneficial to the stress release in a structural change of the positive electrode material during lithiation/delithiation and further improves the structural stability of the positive electrode material.

However, since a bonding unsaturated structure of the surface of the positive electrode material is unstable, the element Al on the surface easily participates in the reactions during charging and discharging, so that the effect of stabilizing the surface of the material cannot be achieved. However, by cooperatively including the compound represented by the foregoing general formula (I) in the electrolytic solution as an additive, the compound can be directionally bonded to Al on the positive surface to form a chelate structure during the first charging, and at the same time, double rings are ring-opened and bonded to each other into a three-dimensional network structure to cover surfaces of positive particles, which can effectively stabilize the element Al on the surface of the positive electrode material and separate the electrolytic solution from the positive interface. This not only improves the structural stability and ion-conducting capability of the positive surface, but also reduces interfacial side reactions, greatly reduces the self-discharge rate of the battery cell, reduces the storage impedance growth rate, and stabilizes cycle performance.

The cooperation relationship between the foregoing positive active material and electrolytic solution proposed in the present application is not only limited to being applicable to a battery structure, but also still applicable when an outer package of the battery, the shape of the battery, and the assembly method (such as lamination, winding) of electrode components are changed due to other needs.

[Positive Electrode Sheet]

A positive electrode sheet includes a positive electrode current collector and a positive electrode material provided on at least one surface of the positive electrode current collector.

As an example, the positive electrode current collector has two surfaces opposite in its own thickness direction, and the positive electrode material is provided on either or both of the two opposite surfaces of the positive electrode current collector.

The positive electrode material of the present application includes a positive active material, and the positive active material is selected from materials capable of deintercalating and intercalating lithium ions. Specifically, the positive active material may be selected from positive electrodes of a lithium nickel cobalt manganese oxide, a lithium nickel cobalt aluminum oxide and other cobalt-containing oxides, and composite positive electrodes composed of the above compounds and a lithium iron phosphate, a lithium manganese iron phosphate, a lithium cobalt oxide, a lithium nickel oxide, a lithium manganese oxide, a lithium nickel manganese oxide, and the like; and one or more of compounds obtained by adding other transition metal or non-transition metal to the foregoing components, but the present invention is not limited to these materials.

In the positive active material of the present application, a contained rate of an element Co satisfies: Co≤0.09. Accordingly, a content of Co that is the most expensive in a ternary positive electrode material is reduced, the cost of the secondary battery can be reduced, and cost performance of the secondary battery is improved. However, the reduction of the element cobalt may lead to the reduction of an electron-conducting capability of the ternary positive electrode material, increase a phenomenon of mixed arrangement of Li/Ni, and reduce ion transport performance of the positive electrode material; and may lead to an irreversible phase transformation of the positive electrode material, aggravate breakage of positive particles and expose many fresh surfaces, so that side reactions between a positive active material and an electrolytic solution occur continuously at an interface between the positive electrode material and the electrolytic solution, which leads to continuous self-discharge in an interior of a battery cell and a significant increase in impedance.

For this reason, in the positive active material of the present application, an element Al is included, and a content of the element Al satisfies: 500 ppm≤Al≤10000 ppm. Uniform distribution of the element Al on a bulk phase and surface of the positive active material is realized by control, which not only effectively reduces a degree of mixed arrangement of Li/Ni due to the foregoing reduction of the element Co, improves structural stability and an ion-conducing capacity of the positive electrode material, but also promotes granulation morphology of the positive electrode material to be uniform, thereby being beneficial to the stress release in a structural change of the positive electrode material during lithiation/delithiation and further improving the structural stability of the positive electrode material.

Further, the element Al on the surface of the positive active material may react with the compound represented by the foregoing general formula (I) included in the electrolytic solution during the first charging to form a chelate structure, so that the element Al on the surface of the positive active material is stabilized, and the formed chelate substance can separate the electrolytic solution from the interface of the positive electrode material, thereby further stabilizing the positive electrode material, reducing the interfacial side reactions, greatly reducing the self-discharge rate of the battery cell, reducing the storage impedance growth rate, and improving the cycle stability and the battery life.

In some embodiments, in the positive active material, the content of the element Al satisfies 1000 ppm≤Al≤10000 ppm, optionally 1000 ppm≤Al≤7000 ppm. Accordingly, the structural stability of the positive electrode material can be further improved, the self-discharge rate of the battery cell can be reduced, the storage impedance growth rate can be reduced, and the cycle stability and the battery life can be improved.

In some embodiments, a general formula of the positive active material is: $LiNi_zMn_yCo_xAl_aO_2$, where $x \le 0.09$, $0.0005 \le a \le 0.01$, $0.5<z<1$, $0<y<0.4$, and $x+y+z+a=1$. Accordingly, a positive active material with a stable structure can be obtained, the self-discharge rate of the battery cell can be reduced, the storage impedance growth rate can be reduced, and the cycle stability and the battery life can be improved.

In some embodiments, a specific surface area of the positive active material is 0.5-3 $m^2/g$, optionally 1~2.5 $m^2/g$. The specific surface area of the positive active material is small, and the insufficient reactive sites may lead to slow lithium ion transport on the surface. The large specific surface area may lead to an increase of side reactions and increase the distance of lithium ion transport on the interface, which is manifested as a significant increase of charge-transfer resistance (Rct). By controlling the specific surface area of the positive active material at 0.5~3 $m^2/g$, the amount of side reactions on the positive surface can be controlled to reduce the influence on the lithium ion transport path and interface impedance, and it can be ensured that there are sufficient active sites on the positive surface for the interface fast transport performance of lithium ions, meeting the need for high-rate charging and discharging of the battery cell.

In some embodiments, the positive electrode material further optionally includes a conductive agent. However, the types of the conductive agent are not specifically limited, and persons skilled in the art can make choice according to actual needs. As an example, the conductive agent for the positive electrode material may be selected from one or more of superconducting carbon, acetylene black, carbon black, Ketjen black, carbon dots, carbon nanotubes, graphene, and carbon nanofibers.

In the secondary battery of the present application, the positive electrode current collector may be metal foil or a composite current collector. For example, as the metal foil, aluminum foil may be used. The composite current collector may include a polymer material base layer and a metal layer formed on at least one surface of the polymer material base. The composite current collector may be formed by synthesizing a metal material (aluminum, aluminum alloy, nickel, nickel alloy, titanium, titanium alloy, silver and silver alloy, or the like) on a polymer material substrate (such as a substrate of polypropylene (PP), polyethylene glycol terephthalate (PET), polybutylene terephthalate (PBT), polystyrene (PS), polyethylene (PE), or the like), but the present application is not limited to these materials.

In the present application, the positive electrode sheet may be prepared according to methods known in the art. As an example, the positive electrode material, conductive agent and binder of the present application may be dispersed in a solvent (such as N-methylpyrrolidone (NMP)) to form a uniform positive electrode slurry; and the positive electrode slurry is coated on the positive electrode current collector, and after processes of drying, cold pressing, and the like, a positive electrode sheet is obtained.

[Electrolytic Solution]

An electrolytic solution plays the role of conducting ions between the positive electrode sheet and the negative electrode sheet, and includes an organic solvent, lithium salt and an additive.

In the present application, the electrolytic solution includes a compound represented by the following general formula as an additive.

(I)

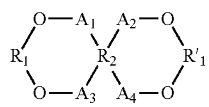

In the general formula (I), $A_1$~$A_4$ each are independently a single bond or an alkylene group with 1-5 carbon atom(s), optionally a single bond or an alkylene group with 1-3 carbon atom(s), optionally a single bond or methylene; $R_1$ and $R_{1'}$ each are independently

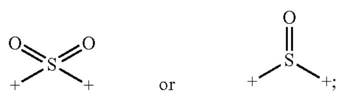

or and $R_2$ is

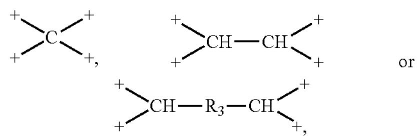

or where $R_3$ is an alkylene group or alkyleneoxy group with 1-3 carbon atom(s), optionally an alkylene group or alkyleneoxy group with 1 or 2 carbon atoms.

By cooperatively using the compound represented by the foregoing general formula (I) in the electrolytic solution as an additive, the compound can be directionally bonded to Al on the positive surface to form a chelate structure during the first charging, and at the same time, double rings of the compound are ring-opened and bonded to each other into a three-dimensional network structure to cover surfaces of positive particles, which can effectively stabilize the element Al on the surface of the positive electrode material and separate the electrolytic solution from the positive interface, thereby not only improving the structural stability and ion-conducting capability of the positive surface, but also reducing the interfacial side reactions, greatly reducing the self-discharge rate of the battery cell, reducing the storage impedance growth rate, improving cycle stability of the battery, and improving the rate discharge capacity efficiency.

In some embodiments, the compound represented by the general formula (I) is selected from at least one of the following compounds 1 to 18, Compound 1

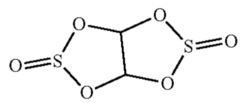

Compound 2

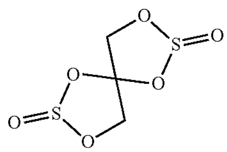

-continued

Compound 3

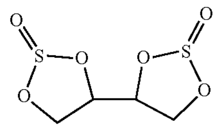

Compound 4

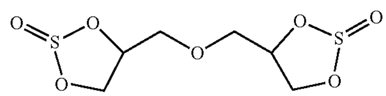

Compound 5

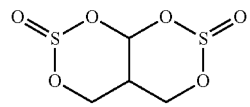

Compound 6

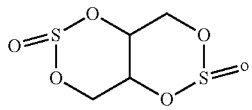

Compound 7

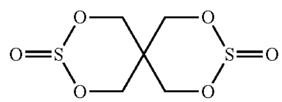

Compound 8

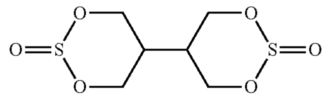

Compound 9

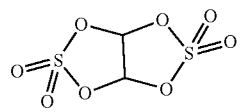

Compound 10

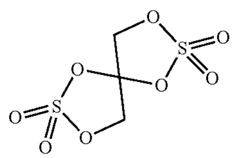

Compound 11

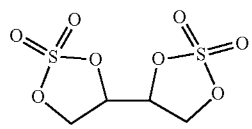

Compound 12

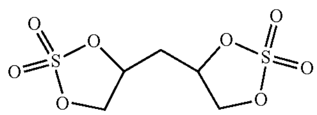

Compound 13

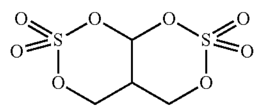

Compound 14

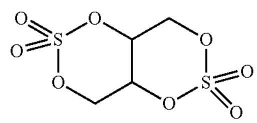

Compound 15

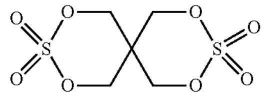

-continued

Compound 16

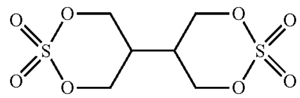

Compound 17

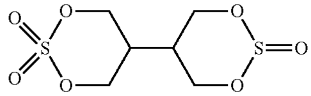

Compound 18

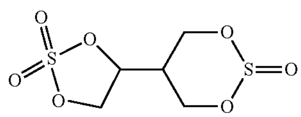

Accordingly, the structural stability of the positive surface can be further improved, the self-discharge rate of the battery cell can be reduced, the storage impedance growth rate can be improved, and the rate discharge capacity efficiency can be improved.

In any embodiment, a mass percent content of the compound represented by the general formula (I) in the electrolytic solution is 0.01%~15%, preferably 0.1%~10%, and further preferably 0.5%~5%. By controlling the range of the content of the compound represented by the general formula (I) within the foregoing ranges, the introduction of the compound represented by the general formula (I) can stabilize Al on the positive surface and ensure that Al plays the role of inhibiting the mixed arrangement of Li/Ni, stabilizing the structure of the positive electrode material and improving the ion-conducting capability. In addition, the chelation of the compound represented by the general formula (I) and Al can also promote the uniform distribution of the compound on the positive surface, and the compound itself is ring-opened and crossbonded to form a network structure, thereby further protecting the positive interface and reducing the interfacial side reactions.

The type of the lithium salt included in the electrolytic solution of the present application is not specifically limited, and can be selected according to actual needs. Specifically, the lithium salt may be selected from one or more of $LiN(C_xF_{2x}+1SO_2)(C_yF_{2y}+1SO_2)$, $LiPF_6$, $LiBF_4$, LiBOB, $LiAsF_6$, $Li(FSO_2)_2N$, $LiCF_3SO_3$ and $LiClO_4$, where x and y are natural numbers.

The organic solvent included in the electrolytic solution of the present application may be selected according to actual needs, and specifically, it may include one or more of linear carbonates, cyclic carbonates, and carboxylic esters. The types of the linear carbonates, the cyclic carbonates, and the carboxylic esters are not specifically limited, and can be selected according to actual needs. Optionally, the organic solvent in the electrolytic solution may include one or more of diethyl carbonate, dipropyl carbonate, ethyl methyl carbonate, methyl propyl carbonate, ethylene propyl carbonate, ethylene carbonate, propylene carbonate, butylene carbonate, γ-butyrolactone, methyl formate, ethyl acetate, propyl acetate, methyl propionate, ethyl propionate, methyl propionate and tetrahydrofuran.

In some embodiments, the electrolytic solution of the present application may further include at least one selected from a cyclic carbonate compound containing an unsaturated bond, a halogen-substituted cyclic carbonate compound, a sulfite compound, a sultone compound, a disulfonic acid compound, a nitrile compound, an aromatic compound, an isocyanate compound, a phosphazene compound, a cyclic acid anhydride compound, a phosphite ester compound, a phosphate ester compound, a borate ester compound and a carboxylic ester compound, as another additive. Accordingly, the performance of the secondary battery can be further improved, for example, the self-discharge rate of the secondary battery is further reduced, the storage impedance growth rate is reduced, and the like.

[Negative Electrode Sheet]

In the secondary battery of the present application, a negative electrode sheet may include a negative electrode current collector and a negative material layer disposed on the negative electrode current collector and including a negative active material, and the negative material layer may be disposed on either or both of surfaces of the negative electrode current collector. The type of the negative active material is not specifically limited, and can preferably be selected from one or more of graphite, soft carbon, hard carbon, meso-carbon microbeads, carbon fibers, carbon nanotubes, elemental silicon, silicon-oxygen compounds, silicon-carbon composites, and lithium titanate.

The negative material layer in the present application may further include a conductive agent, a binder and another optional additive, where the types and contents of the conductive agent and the binder are not specifically limited, and may be selected according to actual needs. The negative material layer is usually formed by coating and drying a negative electrode slurry. The negative electrode slurry is usually formed by dispersing the negative active material, the optional conductive agent and the binder in a solvent and stirring uniformly. The solvent may be N-methylpyrrolidone (NMP) or deionized water. As an example, the conductive agent may be selected from one or more of superconducting carbon, acetylene black, carbon black, Ketjen black, carbon dots, carbon nanotubes, graphene, and carbon nanofibers. As an example, the binder may be selected from one or more of styrene-butadiene rubber (SBR), polyacrylic acid (PAA), polyacrylate sodium (PAAS), polyacrylamide (PAM), polyvinyl alcohol (PVA), sodium alginate (SA), polymethacrylic acid (PMAA), and carboxymethyl chitosan (CMCS). The another optional additive is for example a thinkener (such as sodium carboxymethyl cellulose (CMC-Na), or the like.

The type of the negative electrode current collector is not specifically limited, and can be selected according to actual needs. The negative electrode current collector may be metal foil or a composite current collector. For example, as the metal foil, aluminum foil may be used. The composite current collector may include a polymer material base layer and a metal layer formed on at least one surface of the polymer material substrate. The composite current collector may be formed by synthesizing a metal material (copper, copper alloy, nickel, nickel alloy, titanium, titanium alloy, silver and silver alloy, or the like) on a polymer material substrate (such as a substrate of polypropylene, polyethylene glycol terephthalate, polybutylene terephthalate, polystyrene, polyethylene, or the like).

[Separator]

A secondary battery using an electrolytic solution and some secondary batteries using solid electrolytes, further include a separator. The separator is disposed between a positive electrode sheet and a negative electrode sheet for separation. The type of the separator is not specifically disclosed in the present application, and any well-known porous-structure separator with good chemical stability and mechanical stability can be selected. In some embodiments, the material of the separator may be selected from one or more of glass fiber, nonwoven fabric, polyethylene, polypropylene and polyvinylidene fluoride. The separator may be a single-layered thin film or a multi-layered composite thin film, which is not particularly limited. When the separator is a multi-layered composite thin film, the materials of each layer can be the same or different, which are not particularly limited.

In some embodiments, the positive electrode sheet, the negative electrode sheet and the separator may be subject to a winding process or a lamination process, to obtain an electrode assembly.

In some embodiments, the battery may include an outer package. The outer package may be used to package the foregoing electrode assembly and electrolytic solution.

In some embodiments, the outer package of the secondary battery may be a hard shell such as a hard plastic shell, an aluminum shell, or a steel shell. In some embodiments, the outer package of the secondary battery may be a soft package, such as a bag-type soft package. A material of the soft package may be plastic, for example, polypropylene, polybutylene terephthalate, polybutylene succinate.

The present application has no particular limitation on the shape of the secondary battery, which may be a cylinder, a square, or any other shape. For example, FIG. 1 is a secondary battery 5 in a square structure as an example.

Figure 2:
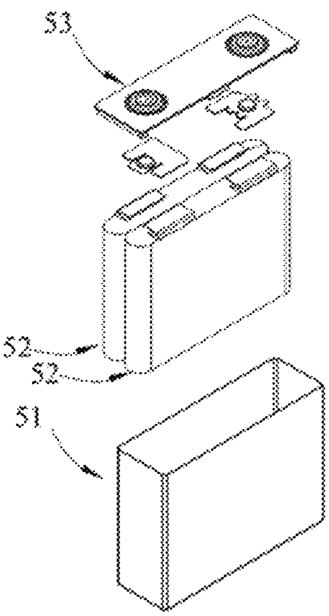
FIG. 2 is an exploded view of a secondary battery according to the embodiment of the present application shown in FIG. 1.

In some embodiments, with reference to FIG. 2, the outer package may include a housing 51 and a top cover assembly 53. The housing 51 may include a bottom plate and side plates connected to the bottom plate. The bottom plate and the side plates are enclosed to form an accommodating cavity. The housing 51 has an opening that is in communication with the accommodating cavity, and the top cover assembly 53 can cover the opening to close the accommodating cavity. A positive electrode sheet, a negative electrode sheet, and a separator may be subject to a winding process or a lamination process to form an electrode assembly 52. The electrode assembly 52 is packaged in the accommodating cavity. The electrolytic solution is infiltrated in the electrode assembly 52. The number of electrode assemblies 52 included in the secondary battery 5 may be one or more, which can be selected by persons skilled in the art according to specific actual needs.

In addition, the secondary battery, the battery module, and the battery pack of the present application will be described below with reference to the accompanying drawings as appropriate.

[Battery Module]

In some embodiments, secondary batteries may be assembled into a battery module, the number of secondary batteries included in the battery module may be one or more, and the specific number may be selected by persons skilled in the art according to application and capacity of the battery module.

Figure 3:
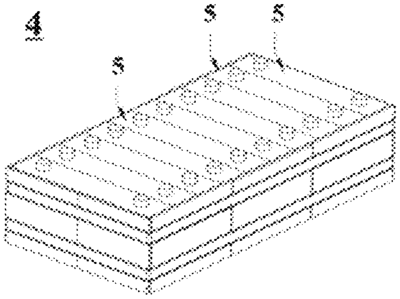
FIG. 3 is a schematic diagram of a battery module according to an embodiment of the present application.

FIG. 3 is a battery module 4 as an example. With reference to FIG. 3, in the battery module 4, a plurality of secondary batteries 5 may be sequentially arranged along a length direction of the battery module 4. Certainly, they may be arranged in any other manner. Further, the plurality of secondary batteries 5 may be fixed with fasteners.

Optionally, the battery module 4 may further include a shell with an accommodating space, and the plurality of secondary batteries 5 are accommodated in the accommodating space.

[Battery Pack]

In some embodiments, the foregoing battery modules may be further assembled into a battery pack, and the number of battery modules included in the battery pack may be selected by persons skilled in the art according to application and capacity of the battery pack.

Figure 4:
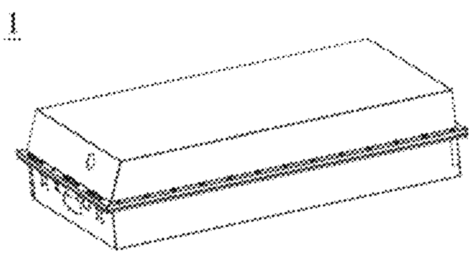
FIG. 4 is a schematic diagram of a battery pack according to an embodiment of the present application.
Figure 5:
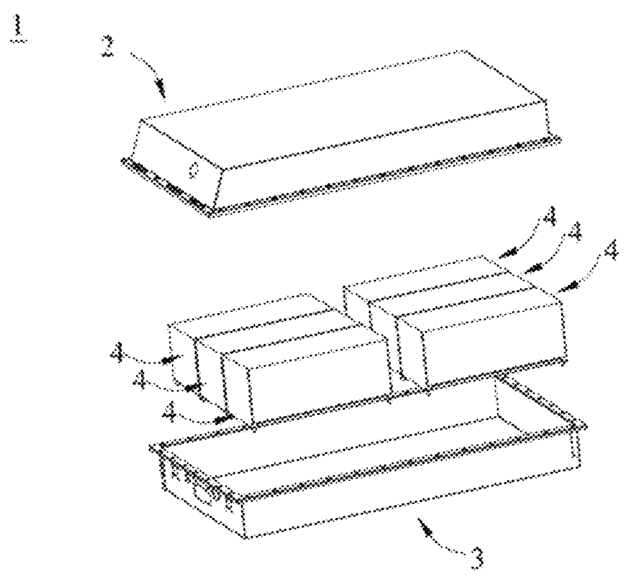
FIG. 5 is an exploded view of a battery pack according to the embodiment of the present application shown in FIG. 4.

FIG. 4 and FIG. 5 are a battery pack 1 as an example. With reference to FIG. 4 and FIG. 5, the battery pack 1 may include a battery box and a plurality of battery modules 4 disposed in the battery box. The battery box includes an upper box body 2 and a lower box body 3. The upper box body 2 can cover the lower box body 3 and form an enclosed space for accommodating the battery modules 4. The plurality of battery modules 4 may be arranged in the battery box in any manner.

[Power Consumption Apparatus]

In addition, the present application further provides a power consumption apparatus including one or more of the secondary battery, the battery module, or the battery pack provided in the present application. The secondary battery, the battery module, or the battery pack provided in the present application can be used as a power source of the apparatus, or as an energy storage unit of the apparatus. The power consumption apparatus of the present application may be, but is not limited to, a mobile device (for example, a mobile phone or a notebook computer), an electric vehicle (for example, a full electric vehicle, a hybrid electric vehicle, a plug-in hybrid electric vehicle, an electric bicycle, an electric scooter, an electric golf cart, or an electric truck), an electric train, a ship and satellite, an energy storage system, and the like.

As the power consumption apparatus, a secondary battery, a battery module, or a battery pack may be selected according to usage requirements.

Figure 6:
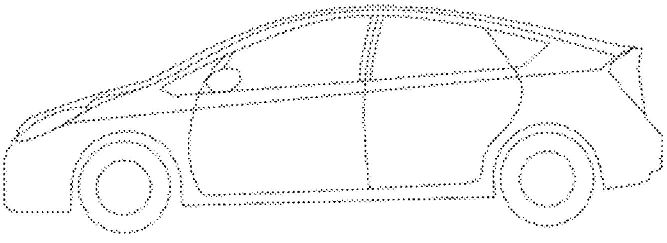
FIG. 6 is a schematic diagram of a power consumption apparatus according to an embodiment of the present application.

FIG. 6 is an apparatus as an example. The apparatus is a full electric vehicle, a hybrid electric vehicle, a plug-in hybrid electric vehicle, or the like. To meet a requirement of the apparatus for high power and high energy density of a secondary battery, a battery pack or a battery module may be used.

In another example, the apparatus may be a mobile phone, a tablet computer, a notebook computer, or the like. The apparatus usually requires lightness and thinness, and a secondary battery may be used as a power source.

EMBODIMENTS

The present invention will be further described below with reference to embodiments. It should be understood that these embodiments are merely intended to illustrate the present invention but not to limit the scope of the present invention. Where specific techniques or conditions are not specified in the embodiments, they are performed according to techniques or conditions described in the literature in the art or according to product specifications. The reagents or instruments used without specifying the manufacturer are conventional products that can be obtained from the market.

Examples 1 to 24 and Comparative Examples 1 to 6

Secondary batteries of embodiments 1 to 24 and comparative examples 1 to 6 are produced according to the following method.

(1) Preparation of Positive Electrode Sheet

Add a positive active material, a conductive agent of acetylene black, and a binder of polyvinylidene fluoride (PVDF) to a solvent of N-methylpyrrolidone (NMP) in a mass ratio of 94:3:3, mix them uniformly to obtain a positive electrode slurry, coat the positive electrode slurry on a positive electrode current collector of aluminum foil, and obtain a positive electrode sheet after processes of drying, cold pressing, slitting, and the like, where structural formulas and element contents of the positive active material are shown in Table 1.

(2) Preparation of Negative Electrode Sheet

Add artificial graphite as a positive active substance, a conductive agent of acetylene black, a binder of styrene-butadiene rubber (SBR), and a thinkener of sodium carboxymethyl cellulose (CMC-Na) to a solvent of deionized water in a mass ratio of 95:2:2:1, mix them uniformly to obtain a negative electrode slurry, coat the negative electrode slurry on a negative electrode current collector of copper foil, and obtain a negative electrode sheet after processes of drying, cold pressing, slitting, and the like.

(3) Preparation of Electrolytic Solution

Mix organic solvents of EC/EMC uniformly in an argon atmosphere glove box ($H_2O$<0.1 ppm, and $O_2$<0.1 ppm) in a volume ratio of 3/7, add $LiPF_6$ lithium salt of 1 mol/L to dissolve in the organic solvents, add the component represent by the general formula (I) or another additive with the type and quantity shown in Table 1, and stir them evenly to obtain an electrolytic solution.

(4) Preparation of Separator

Use a polypropylene film as a separator.

(5) Production of Secondary Battery

Stack a positive electrode sheet, a separator, and a negative electrode sheet in order, so that the separator is located between the positive electrode sheet and the negative electrode sheet, and then wind them to obtain an electrode assembly; and place the electrode assembly in a battery housing, inject an electrolytic solution after drying, and produce a secondary battery after processes of chemical conversion, standing, and the like.

[Positive Electrode Material Related Parameter Test]

1) Text on Content of Element Al

Take 2 g of dried positive electrode material powder from a positive electrode sheet, dissolve completely with aqua regia ($H_2SO_4$:$HNO_3$=1:1), and conduct a text with reference to the standard of EPA 6010D-2018, with reference to Table 1 for specific values.

2) Test on Specific Surface Area S

Scrape a positive electrode material from a positive electrode sheet with a scraper, and conduct a text with reference to the standard of GB/T 19587-2004, with reference to Table 1 for specific values.

[Battery Performance Test]

1. Text on Self-discharge Rate of Secondary Battery

At 25° C., charge a secondary battery at a constant current of 0.33 C until a voltage is 4.35V, then charge it at a constant voltage of 4.35V until a current is less than 0.05 C, and perform discharging on it at a constant current of 0.33 C until the voltage is 2.8V; after performing charging and discharging once, charge the secondary battery at the constant current of 0.33 C until the voltage is 4.35V, and charge it at the constant voltage of 4.35V until the current is less than 0.05 C; and after standing for 5 minutes, measure an initial voltage V1 (mV), place the secondary battery in an oven at 60° C. for 48 hours, and measure a voltage of the secondary battery V2 (mV) after taking it out to ordinary temperature, where a self-discharge rate K of the secondary battery is calculated with a formula K=(V2-V1)/48 (the unit of mV/h).

2. Test on Storage Impedance Growth Rate

Charge a secondary battery at a constant current of 0.33 C until a voltage is 4.35V and charge it at a constant voltage until a current is less than 0.05 C; after standing for 5 minutes, measure an initial voltage V1, perform discharging on the secondary battery at a current of 4 C for 15 seconds, and measure a voltage V3 after discharge, where initial impedance $R_1$ of the secondary battery is calculated with a formula $R_1$=(V3−V1)/4 C (the unit of Ω); place the secondary battery in an oven at 60° C. for 1 month, and measure impedance $R_2$ of the secondary battery after storage according to the test method of $R_1$ after taking it out to ordinary temperature, where a storage impedance growth rate is $\Delta R=R_2/R_1\times100\%$.

3. Test on Rate Discharge Capacity Efficiency after Storage

Charge the secondary battery after storage in test 2 at a constant current of 1 C until a voltage is 4.35V, charge it at a constant voltage until a current is less than 0.05 C, and then perform discharging on the secondary battery at the constant current of 1 C until the voltage is 2.8V to obtain a discharge capacity Q1 at 1 C; and charge the secondary battery at the constant current of 1 C until the voltage is 4.35V, charged it at a constant voltage until the current is less than 0.05 C, then perform discharging on the secondary battery at a constant current of 3 C until the voltage is 2.8V to obtain a discharge capacity Q3 at 3 C, and calculate rate discharge capacity efficiency with a formula Q3/Q1×100%.

4. Test on Cycle Performance at 45° C.

At 45° C., charge a secondary battery at a constant current of 1 C until a voltage is 4.35V, then charge it at a constant voltage of 4.35V until a current is less than 0.05 C, and perform discharging on the secondary battery at the constant current of 1 C until the voltage is 2.8V, which is a cycle of charge and discharge; and repeat the charge and discharge in this way, and calculate a capacity retention rate of the secondary battery after 1000 cycles.

The capacity retention rate (%) of the secondary battery after 1000 cycles at 45° C.=(a discharge capacity at the $1000^{th}$ cycle/a discharge capacity at the first cycle)×100%.

TABLE 1

| | Positive electrode material | | | | Electrolytic solution | | | |
|---|---|---|---|---|---|---|---|---|
| Sequence number | Structural formula | Content of element Co % | Content of element Al ppm | Specific surface area $m^2/g$ | Type of compound represented by general formula (I) | Contents of compound represented by general formula (I) % | Type of another additive | Content of another additive % |
| Embodiment 1 | $LiNi_{0.55}Mn_{0.355}Co_{0.09}Al_{0.005}O_2$ | 9% | 5000 | 1.3 | Compound 11 | 1 | / | / |
| Embodiment 2 | $LiNi_{0.55}Mn_{0.3795}Co_{0.07}Al_{0.0005}O_2$ | 7% | 500 | 1.3 | Compound 11 | 1 | / | / |
| Embodiment 3 | $LiNi_{0.55}Mn_{0.379}Co_{0.07}Al_{0.001}O_2$ | 7% | 1000 | 1.3 | Compound 11 | 1 | / | / |
| Embodiment 4 | $LiNi_{0.55}Mn_{0.375}Co_{0.07}Al_{0.005}O_2$ | 7% | 5000 | 1.3 | Compound 11 | 1 | / | / |
| Embodiment 5 | $LiNi_{0.55}Mn_{0.373}Co_{0.07}Al_{0.007}O_2$ | 7% | 7000 | 1.3 | Compound 11 | 1 | / | / |
| Embodiment 6 | $LiNi_{0.55}Mn_{0.37}Co_{0.07}Al_{0.01}O_2$ | 7% | 10000 | 1.3 | Compound 11 | 1 | / | / |

TABLE 1-continued

| Sequence number | Positive electrode material: Structural formula | Content of element Co % | Content of element Al ppm | Specific surface area $m^2/g$ | Electrolytic solution: Type of compound represented by general formula (I) | Contents of compound represented by general formula (I) % | Type of another additive | Content of another additive % |
|---|---|---|---|---|---|---|---|---|
| Embodiment 7 | $LiNi_{0.55}Mn_{0.375}Co_{0.07}Al_{0.005}O_2$ | 7% | 5000 | 0.2 | Compound 11 | 1 | / | / |
| Embodiment 8 | $LiNi_{0.55}Mn_{0.375}Co_{0.07}Al_{0.005}O_2$ | 7% | 5000 | 0.5 | Compound 11 | 1 | / | / |
| Embodiment 9 | $LiNi_{0.55}Mn_{0.375}Co_{0.07}Al_{0.005}O_2$ | 7% | 5000 | 1 | Compound 11 | 1 | / | / |
| Embodiment 10 | $LiNi_{0.55}Mn_{0.375}Co_{0.07}Al_{0.005}O_2$ | 7% | 5000 | 2.5 | Compound 11 | 1 | / | / |
| Embodiment 11 | $LiNi_{0.55}Mn_{0.375}Co_{0.07}Al_{0.005}O_2$ | 7% | 5000 | 3 | Compound 11 | 1 | / | / |
| Embodiment 12 | $LiNi_{0.55}Mn_{0.375}Co_{0.07}Al_{0.005}O_2$ | 7% | 5000 | 1.3 | Compound 11 | 0.01 | / | / |
| Embodiment 13 | $LiNi_{0.55}Mn_{0.375}Co_{0.07}Al_{0.005}O_2$ | 7% | 5000 | 1.3 | Compound 11 | 0.1 | / | / |
| Embodiment 14 | $LiNi_{0.55}Mn_{0.375}Co_{0.07}Al_{0.005}O_2$ | 7% | 5000 | 1.3 | Compound 11 | 0.5 | / | / |
| Embodiment 15 | $LiNi_{0.55}Mn_{0.375}Co_{0.07}Al_{0.005}O_2$ | 7% | 5000 | 1.3 | Compound 11 | 2 | / | / |
| Embodiment 16 | $LiNi_{0.55}Mn_{0.375}Co_{0.07}Al_{0.005}O_2$ | 7% | 5000 | 1.3 | Compound 11 | 5 | / | / |
| Embodiment 17 | $LiNi_{0.55}Mn_{0.375}Co_{0.07}Al_{0.005}O_2$ | 7% | 5000 | 1.3 | Compound 11 | 10 | / | / |
| Embodiment 18 | $LiNi_{0.55}Mn_{0.375}Co_{0.07}Al_{0.005}O_2$ | 7% | 5000 | 1.3 | Compound 11 | 15 | / | / |
| Embodiment 19 | $LiNi_{0.55}Mn_{0.375}Co_{0.07}Al_{0.005}O_2$ | 7% | 5000 | 1.3 | Compound 11 | 1 | LiODFB | 1 |
| Embodiment 20 | $LiNi_{0.55}Mn_{0.375}Co_{0.07}Al_{0.005}O_2$ | 7% | 5000 | 1.3 | Compound 11 | 1 | FEC | 1 |
| Embodiment 21 | $LiNi_{0.55}Mn_{0.375}Co_{0.07}Al_{0.005}O_2$ | 7% | 5000 | 1.3 | Compound 12 | 1 | / | / |
| Embodiment 22 | $LiNi_{0.55}Mn_{0.375}Co_{0.07}Al_{0.005}O_2$ | 7% | 5000 | 1.3 | Compound 3 | 1 | / | / |
| Embodiment 23 | $LiNi_{0.55}Mn_{0.375}Co_{0.07}Al_{0.005}O_2$ | 7% | 5000 | 1.3 | Compound 15 | 1 | / | / |
| Embodiment 24 | $LiNi_{0.55}Mn_{0.375}Co_{0.07}Al_{0.005}O_2$ | 7% | 5000 | 1.3 | Compound 18 | 1 | / | / |
| Comparative Example 1 | $LiNi_{0.55}Mn_{0.33}Co_{0.12}O_2$ | 12% | 0 | 1.3 | / | / | / | / |
| Comparative Example 2 | $LiNi_{0.55}Mn_{0.38}Co_{0.07}O_2$ | 7% | 0 | 1.3 | / | / | / | / |
| Comparative Example 3 | $LiNi_{0.55}Mn_{0.375}Co_{0.07}Al_{0.005}O_2$ | 7% | 5000 | 1.3 | / | / | / | / |
| Comparative Example 4 | $LiNi_{0.55}Mn_{0.3799}Co_{0.07}Al_{0.0001}O_2$ | 7% | 100 | 1.3 | Compound 11 | 1 | / | / |
| Comparative Example 5 | $LiNi_{0.55}Mn_{0.365}Co_{0.07}Al_{0.015}O_2$ | 7% | 15000 | 1.3 | Compound 11 | 1 | / | / |
| Comparative Example 6 | $LiNi_{0.55}Mn_{0.38}Co_{0.07}O_2$ | 7% | 0 | 1.3 | / | / | VC | 1 |

TABLE 2

| Sequence number | Self-discharge rate mV/h | Storage impedance growth rate % | Rate discharge capacity efficiency after storage % |
|---|---|---|---|
| Embodiment 1 | 70 | 51% | 96% |
| Embodiment 2 | 190 | 75% | 91% |
| Embodiment 3 | 150 | 68% | 93% |
| Embodiment 4 | 90 | 53% | 95% |
| Embodiment 5 | 120 | 62% | 94% |
| Embodiment 6 | 150 | 70% | 92% |
| Embodiment 7 | 82 | 79% | 87% |
| Embodiment 8 | 80 | 62% | 92% |
| Embodiment 9 | 87 | 56% | 94% |
| Embodiment 10 | 95 | 63% | 92% |
| Embodiment 11 | 100 | 70% | 90% |
| Embodiment 12 | 170 | 78% | 89% |
| Embodiment 13 | 120 | 72% | 92% |
| Embodiment 14 | 95 | 56% | 94% |
| Embodiment 15 | 75 | 50% | 96% |
| Embodiment 16 | 70 | 60% | 93% |
| Embodiment 17 | 67 | 68% | 92% |
| Embodiment 18 | 72 | 80% | 86% |
| Embodiment 19 | 85 | 51% | 95% |
| Embodiment 20 | 83 | 50% | 95% |
| Embodiment 21 | 92 | 54% | 94% |
| Embodiment 22 | 94 | 55% | 94% |
| Embodiment 23 | 93 | 54% | 94% |
| Embodiment 24 | 95 | 55% | 94% |
| Comparative Example 1 | 200 | 80% | 88% |
| Comparative Example 2 | 300 | 100% | 85% |
| Comparative Example 3 | 280 | 81% | 87% |
| Comparative Example 4 | 280 | 83% | 85% |
| Comparative Example 5 | 230 | 82% | 90% |
| Comparative Example 6 | 250 | 87% | 87% |

The following can be found by analyzing the parameters in Table 1 and the results in Table 2.

With the comparison among Comparative Examples 1, 2, and 6, it can be seen that, when only the content of the element Co is reduced to lower the cost of the positive electrode material and there is no the element Al in the positive electrode material, the self-discharge rate and the storage impedance growth rate of the secondary battery significantly increase, and even if an additive of vinylene carbonate (VC) that inhibits the reduction of the solvent in the electrolytic solution is added in the electrolytic solution, the performance of the secondary battery cannot be improved well. In addition, with the comparison between Comparative Example 2 and Comparative Example 3, it can be seen that, by including the element Al in the positive electrode material in which the content of the element Co is reduced, the self-discharge rate and the storage impedance growth rate can be reduced to a certain extent, and the rate discharge capacity efficiency after storage can be improved. The reason is that the addition of the element Al can reduce the mixed arrangement of Li/Ni due to the reduction of the content of Co, which improves the structural stability of the positive electrode material, thereby improving the performance of the secondary battery to a certain extent. However, since a bonding unsaturated structure of the surface of the positive electrode material is unstable, the element Al on the surface easily participates in the reactions during charging and discharging, so that the effect of completely stabilizing the surface of the material cannot be achieved.

With the comparison among Embodiment 1, Embodiment 4, and Comparative Example 1 (see Table 3), it can be seen that, by adding an appropriate amount of the element Al while reducing the element Co, and including the compound represented by the general formula (I) in the electrolytic solution, not only can the cost of the secondary battery be reduced due to the reduction of the content of the high-priced Co, but also the self-discharge rate of the secondary battery can be reduced, the storage impedance growth rate can be reduced, and the rate discharge capacity efficiency after storage can be improved. The reason is that, by cooperatively using the compound represented by the foregoing general formula (I) in the electrolytic solution as an additive, the compound can be directionally bonded to Al on the positive surface to form a chelate structure during the first charging, and at the same time, double rings of the compound are ring-opened and bonded to each other into a three-dimensional network structure to cover surfaces of positive particles, which can effectively stabilize the element Al on the surface of the positive electrode material and separate the electrolytic solution from the positive interface, thereby not only improving the structural stability and ion-conducting capability of the positive surface, but also reducing the interfacial side reactions, greatly reducing the self-discharge rate of the battery cell, reducing the storage impedance growth rate, improving cycle stability of the battery, and improving the rate discharge capacity efficiency.

In addition, with the comparison among Embodiments 2 to 6 and Comparative Examples 4 and 5, it can be seen that, if the element Al contained in the positive electrode is small, it is insufficient to compensate for the performance deterioration of the secondary battery due to the reduction of the content of Co. When the amount of the element Al added gradually increases, the sufficient element Al can effectively reduce the mixed arrangement of Li/Ni due to the reduction of the content of Co, which stabilizes the bulk phase and surface structure of the positive electrode material; and by combining the stabilizing effect and the protection effect of the crossbonding network of the compound additive represented by the general formula (I) contained in the electrolytic solution on the element Al, the various performance of the secondary battery is greatly improved and is superior to the performance of a secondary battery with a positive electrode system having a high content of Co. Secondary battery performance. As the amount of Al added increases continuously to go beyond a certain range, many inactive sites are formed in the positive electrode material, which restricts the internal conduction and diffusion of lithium ions, worsens the ion-conducting capability of the positive electrode material, and leads to a drop of synthetic performance of the secondary battery. When the amount of the element Al added is in a preferred range of 1000~7000, the self-discharge rate of the secondary battery is less than 150 mV/h, the storage impedance growth rate is less than 70%, the rate discharge capacity efficiency is greater than 93%, and the synthetic performance is particularly excellent.

The comparison among Embodiments 4 and 7~11 illustrates the effect of adjusting the specific surface area of the positive electrode material on the performance of the secondary battery. As the specific surface area of the positive electrode material gradually increases, the self-discharge rate tends to increase gradually, because the specific surface area directly affects the degree of interfacial side reactions. The larger the specific surface area, the more side reactions, and the self-discharge rate increases accordingly. The impedance growth after storage and the rate discharge capacity efficiency show a trend of improvement first and then deterioration, because a certain degree of side reactions can play the role of separating the positive interface from the electrolytic solution, inhibiting the further occurrence of side reactions, thereby reducing the impedance growth and improving the rate performance. However, when the specific surface area is large, excessive side reactions bring about significant deterioration of the overall performance. When the specific surface area of the positive electrode material is in a preferred range of 0.5~2.5, the self-discharge rate of the secondary battery is less than 100 mV/h, the storage impedance growth rate is less than 65%, and the rate discharge capacity efficiency is greater than 92%.

From Embodiments 4 and 12~24, the effects of different amounts or different types of the compound added and represented by the general formula (I) or addition together with another additive on the performance of the secondary battery are shown. From the results of the embodiments, as the amount of the compound added and represented by the general formula (I) gradually increases, the self-discharge rate of the secondary battery shows a trend of gradually decreasing, because the sufficient compounds of general formula (I) can act with the element Al to form a dense network structure on the positive surface, thereby completely separating the positive interface from the electrolytic solution. Therefore, the side reactions are reduced, and the self-discharge rate is also significantly reduced accordingly. However, the impedance growth after storage and the rate discharge capacity efficiency show a trend of first improvement and then deterioration. The reason is that as the compound of the formula (I) gradually increases within a certain range, the amount of the compound of the general formula (I) that can participate in stabilizing the element Al on the positive surface gradually increases, and combined with the protective effect of ring-opening, crossbonding and network forming of the compound of the formula (I) itself, the interfacial phase transformation and side reactions gradually reduces, and the impedance growth after storage and the rate discharge performance are effectively improved. However, when the amount of the compound of the general formula (I) is excessive, not only is the chelating stabilization effect with Al affected, but also the impedance significantly increases due to excessive interface protection, the transport path of lithium ions is lengthened, the difficulty of lithium ion transport is increased, and thus the impedance growth and the rate discharge capacity are deteriorated. When the amount of the compound of the general formula (I) added is in a preferred range of 0.1~10%, the self-discharge rate of the secondary battery is less than 120 mV/h, the storage impedance growth rate is less than 75%, the rate discharge capacity efficiency is greater than 92%, and the overall performance are greatly improved.

In addition, various compounds represented by the general formula (I) all can achieve the same degree of performance improvement effect. In addition, by using the compound represented by the general formula (I) with lithium difluorooxalateborate (LiODFB) or fluoroethylene carbonate (FEC), three-dimensional ion channels can be formed on the positive surface, and the interfacial side reactions at the negative electrode can be reduced, which has a better performance improvement effect.

TABLE 3

| | Positive electrode material | | | Preparing an electrolytic solution | | | | | |
|---|---|---|---|---|---|---|---|---|---|
| Sequence number | Structural formula | Content of element Co % | Content of element Al ppm | Type of compound of general formula (I) | Content of compound of general formula (I) | Self-discharge rate mV/h | Storage impedance growth rate % | Rate discharge capacity efficiency after storage % | Coast of battery cell material |
| Embodiment 1 | $LiNi_{0.55}Mn_{0.355}Co_{0.09}Al_{0.005}O_2$ | 9% | 5000 | Compound 11 | 1 | 70 | 51% | 96% | 101% |
| Embodiment 4 | $LiNi_{0.55}Mn_{0.375}Co_{0.07}Al_{0.005}O_2$ | 7% | 5000 | Compound 11 | 1 | 90 | 53% | 95% | 100% |
| Comparative Example 1 | $LiNi_{0.55}Mn_{0.33}Co_{0.12}O_2$ | 12% | 0 | / | / | 200 | 80% | 88% | 105% |

TABLE 4

| Sequence number | Structural formula | Content of element Al ppm | Specific surface area of positive electrode $m^2/g$ | Content of compound 11 % | Type of another additive | Content of another additive % | Self-discharge rate mV/h | Storage impedance growth rate % | Rate discharge capacity efficiency after storage % | Cycle capacity retention rate at 45° C. % |
|---|---|---|---|---|---|---|---|---|---|---|
| Embodiment 4 | $LiNi_{0.55}Mn_{0.375}Co_{0.07}Al_{0.005}O_2$ | 5000 | 1.3 | 1 | / | / | 90 | 53% | 95% | 80% |
| Embodiment 14 | $LiNi_{0.55}Mn_{0.375}Co_{0.07}Al_{0.005}O_2$ | 5000 | 1.3 | 0.5 | / | / | 95 | 56% | 94% | 78% |
| Embodiment 19 | $LiNi_{0.55}Mn_{0.375}Co_{0.07}Al_{0.005}O_2$ | 5000 | 1.3 | 1 | LiODFB | 1 | 85 | 51% | 95% | 81% |
| Embodiment 20 | $LiNi_{0.55}Mn_{0.375}Co_{0.07}Al_{0.005}O_2$ | 5000 | 1.3 | 1 | FEC | 1 | 83 | 50% | 95% | 82% |

In addition, with reference to Table 4, it can be seen that, in Embodiments 4, 14, 19 and 20, the addition of an appropriate content of the compound of the general formula (I) can improve the high-temperature cycle capacity retention rate of the secondary battery. The main reason is that after the side reactions at the positive surface are reduced, it is beneficial to improvement of the long-range stability of the positive electrode material interface, thereby improving the cycle performance. On this basis, LiODFB and FEC are further added, which can further improve the ion-conducting capability of the positive electrode material and the stability of the negative interface, thereby further improving the high-temperature cycle performance of the secondary battery.

It should be noted that the present application is not limited to the foregoing embodiments. The foregoing embodiments are merely examples, and embodiments having substantially the same constitution as the technical idea and exerting the same effects within the technical solution of the present application are all included within the technical scope of the present application. In addition, various modifications may be made to the embodiments by persons skilled in the art without departing from the spirit and scope of the present application, and other embodiments that are constructed by combining some of the constituent elements of the embodiments are also included in the scope of the present application.

What is claimed is:

1. A secondary battery, comprising:

a positive electrode sheet, a negative electrode sheet, and an electrolytic solution;

wherein the positive electrode sheet comprises a positive active material, a general formula of the positive active material being: $LiNi_zMn_yCo_xAl_aO_2$, wherein $0.07 \leq x \leq 0.09$, $0.0005 \leq a \leq 0.01$, $z=0.55$, $0.355 \leq y \leq 0.3795$, and $x+y+z+a=1$;

the electrolytic solution comprises one of the following compounds:

Compound 11

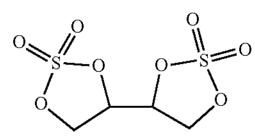

Compound 12

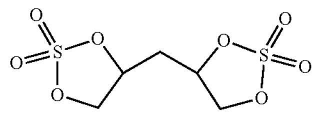

Compound 13

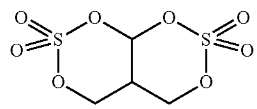

Compound 15

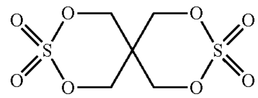

Compound 18

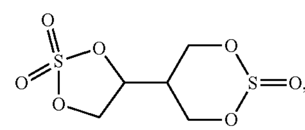

, and wherein a mass percent content of the compound in the electrolytic solution is 0.01% ~15%.

2. The secondary battery according to claim 1, wherein the electrolytic solution further comprises another additive selected from at least one of lithium tetrafluoroborate, lithium bisoxalateborate, lithium difluorooxalateborate, and tris(trimethylsilyl) borate.

3. The secondary battery according to claim 2, wherein a mass percent content of a total amount of the another additive in the electrolytic solution is 0.2% ~3%.

4. The secondary battery according to claim 1, wherein a specific surface area of the positive active material is 0.5~3$m^2$/g, optionally 0.5~2.5 $m^2$/g.

5. A battery module, comprising the secondary battery according to claim 1.

6. A battery pack, comprising the battery module according to claim 5.

7. A power consumption apparatus, comprising the battery pack according to claim 6.

8. A power consumption apparatus, comprising the battery module according to claim 5.

9. A power consumption apparatus, comprising the secondary battery according to claim 1.

10. The secondary battery according to claim 1, wherein $LiNi_zMn_yCo_xAl_aO_2$ is:

$LiNi_{0.55}Mn_{0.355}Co_{0.09}Al_{0.005}O_2$,
$LiNi_{0.55}Mn_{0.3795}Co_{0.07}Al_{0.0005}O_2$,
$LiNi_{0.55}Mn_{0.379}Co_{0.07}Al_{0.001}O_2$,
$LiNi_{0.55}Mn_{0.375}Co_{0.07}Al_{0.005}O_2$,
$LiNi_{0.55}Mn_{0.373}Co_{0.07}Al_{0.007}O_2$,
$LiNi_{0.55}Mn_{0.37}Co_{0.07}Al_{0.01}O_2$, or
$LiNi_{0.55}Mn_{0.375}Co_{0.07}Al_{0.005}O_2$.

* * * * *